United States Patent [19]

Williames

[11] Patent Number: 5,488,802
[45] Date of Patent: Feb. 6, 1996

[54] SEEDLING TRANSFER ARRANGEMENT

[75] Inventor: Geoffrey A. Williames, Warragul, Australia

[73] Assignee: William Hi-Tech International Pty. Ltd., Australia

[21] Appl. No.: 603,777

[22] PCT Filed: Mar. 7, 1990

[86] PCT No.: PCT/AU90/00093

§ 371 Date: Jan. 31, 1991

§ 102(e) Date: Jan. 31, 1991

[87] PCT Pub. No.: WO90/10377

PCT Pub. Date: Sep. 20, 1990

[30] Foreign Application Priority Data

Mar. 7, 1989 [AU] Australia .................... PJ3080

[51] Int. Cl.$^6$ ............................................. A01G 31/00
[52] U.S. Cl. .................... 47/101; 47/901; 111/105
[58] Field of Search ................ 47/901, 1.01, 1 A; 111/104, 105

[56] References Cited

U.S. PATENT DOCUMENTS

| | | | |
|---|---|---|---|
| 3,842,533 | 10/1974 | Mayer | 47/1.01 |
| 4,947,579 | 8/1990 | Harrison | 111/105 |
| 4,947,582 | 8/1990 | Visser | 47/1.01 |
| 4,998,945 | 3/1991 | Holt | 47/1.01 |
| 5,048,434 | 9/1991 | Forster et al. | 47/901 |

*Primary Examiner*—Henry E. Raduazo
*Attorney, Agent, or Firm*—Learman & McCulloch

[57] ABSTRACT

An apparatus for use in transplanting seedlings between propagation containers. More particularly the apparatus of this invention is intended to enable the transfer of seedlings from a chain of connected cells in which the seedlings have been grown for a period of time to a larger cell chain or other container. The apparatus includes a means to move said cells along a first and second predetermined path, and a first and second plant delivery path extending transversely to said first and second predetermined path. The apparatus includes a means lift seedlings from cells on said first path and to deliver them to cells moving along said second path into a prepared planting position.

11 Claims, 4 Drawing Sheets

SEEDLING TRANSFER ARRANGEMENT

BACKGROUND OF THE INVENTION

Typically cell chains useful in the application of the present invention may be of the type disclosed in U.S. Pat. No. 4,763,443. These cell chains comprise a plurality of adjacent in line cells each adapted to receive a seed or seedling with a propagating medium, the cell chain consisting of rigid lengths of a number of such cells hinged together in a manner enabling the chain to be fed as desired in a single line of cells or to be stored with the rigid lengths arranged side by side nesting into one another to minimise the storage area required.

As will be readily recognised, seedlings or plants can only be grown in one sized container or pot for a certain period of time and thereafter they must be potted up or transferred to larger containers or pots. There are a number of difficulties in achieving this in an automatic or mechanised manner without labour intensive work. These problems include the ability to handle and control the movement of the plants or seedlings to be transferred. Common difficulties that occur are due to the fact that seedlings themselves differ in appearance, some have long stalks and high foliage and others have low foliage with virtually no stalks. Further, with some plants the root structure tends to flow between adjacent containers making it difficult to remove one plant at a time to be transferred. Other difficulties include the ability to control movement of the containers into which the plants or seedlings are to be transferred, the preparation of the growing medium in the new containers to receive the plants or seedlings, the ability to recognise where seedlings might not have propagated or perhaps have propagated incorrectly such that they wold not survive or would not produce useful or saleable plants, and the ability to automatically transfer the plants or seedlings in a manner such that there are no gaps left in the new containers bearing in mind not all the original containers will have appropriate plants for further propagation.

The objective of the present invention is to provide improved apparatus in a plant or seedling transplanting mechanism which will overcome or mimimise at least some of the aforementioned difficulties. A preferred objective is to provide a plant or seedling transplanting mechanism capable of efficiently transplanting seedlings from a cell chain into a second array of containers.

SUMMARY OF THE INVENTION

According to a first aspect of the present invention, there is provided a device for preparing a container adapted to receive a transplanted seedling or the like, said device comprising a conveying mechanism to transport the containers with a propagating medium therein past a mechanism for producing a plant receiving recess in the propagating medium, said plant recess producing mechanism comprising a first member having a substantially annular surface which can be pressed down against the propagating medium arranged beneath the mechanism and a second member arranged to project downwardly through said annular surface to produce said plant receiving recess. Conveniently said first and second members may be moved independently and preferably by air actuated cylinders.

According to a second aspect of the present invention, there is provided a device for indexing a cell chain past a transplanting station in a seedling transplanting mechanism, said device comprising a guide track defining a predetermined path of travel of said cell chain and an element selectably engageable with upwardly facing openings of the cell chain to effect movement of the cell chain along said guide track, said engagement element being moved in the longitudinal direction of the guide track by a first actuating means and being selectably raised or lowered by a second actuating means into or out of engagement with the cell chain, said engagement element further including a pair of spaced downwardly directed projections adapted to locate in spaced upwardly facing openings of said cell chain.

According to a third aspect of the present invention, apparatus is provided for moving a plant or seedling from one container conveyed along a first predetermined path to a prepared planting position in a second container moved along a second predetermined path, said apparatus comprising a first plant delivery path extending transversely from said first predetermined path at a level at or above a top edge of said one container, and a second plant delivery path extending from said first plant delivery path to a position adjacent said second predetermined path to deliver a plant or seedling to said prepared planting position in said second container. Conveniently said apparatus further includes a guide chute adapted to be moved to an extended position arranged at least partially across the first predetermined path above said one container to form an extension of said first delivery path at least partially across said one container, said guide chute also being retractable from said extended position, ejection means for moving the plant or seedling upwardly out of said container into said extension of said first delivery path, first movement means for moving said plant or seedling along said first delivery path into said second delivery path, and second movement means for moving said plant or seedling along said second delivery path into said prepared planting position.

Conveniently, the guide chute comprises a pair of laterally spaced blades adapted to be moved to and fro across the first predetermined path, each said blade having a forward end and an upper edge diverging from said forward end adapted to lift plant foliage as the blade moves across said first predetermined path, and each said blade further having a lower cutting edge adapted to engage with the top edge of said one container to separate any root mass that might extend therefrom into an adjacent container. Preferably the first delivery path includes upstanding wall means having an upper edge diverging from a position adjacent the first predetermined path, the upper edge of said wall means co-operating with the upper edge of a said blade upon movement of a said blade into said first delivery path to lift plant foliage. Conveniently, the ejection means comprises a push member adapted to extend upwardly through a bottom opening is said one container.

Conveniently, the first movement means comprises a pusher member movable across said first predetermined path, said pusher member being moved within said guide chute and having a forward end configures to correspond to the shape of a propagating medium plug of the plant or seedling being handled, said forward end of the pusher member thereby being able to hold said plant or seedling in said second delivery path until the second movement means is actuated to move said plant or seedling into the prepared planting position.

The second delivery path may comprise a stationary tube like member having openings along its length to enable a plant or seedling to be introduced therein from the first delivery path and to enable the plant or seedling to be moved therefrom after planting in said second container. The second movement means may advantageously be an actuating mechanism located generally outside of the tube like member but having a push member movable along the second delivery path inwardly of said tube like member, the push member being generally horse shoe shaped to permit introduction of a plant or seedling within the push member such that the pusher member engages only the propagating medium plug of the plant or seedling when it is moved along the second delivery path.

The present invention also anticipates the provision of a transplanting mechanism including any one or more of the foregoing features or any features apparent from the following description of preferred embodiments illustrated in part in the accompanying drawings.

THE PREFERRED EMBODIMENTS

Figures 1, 2:
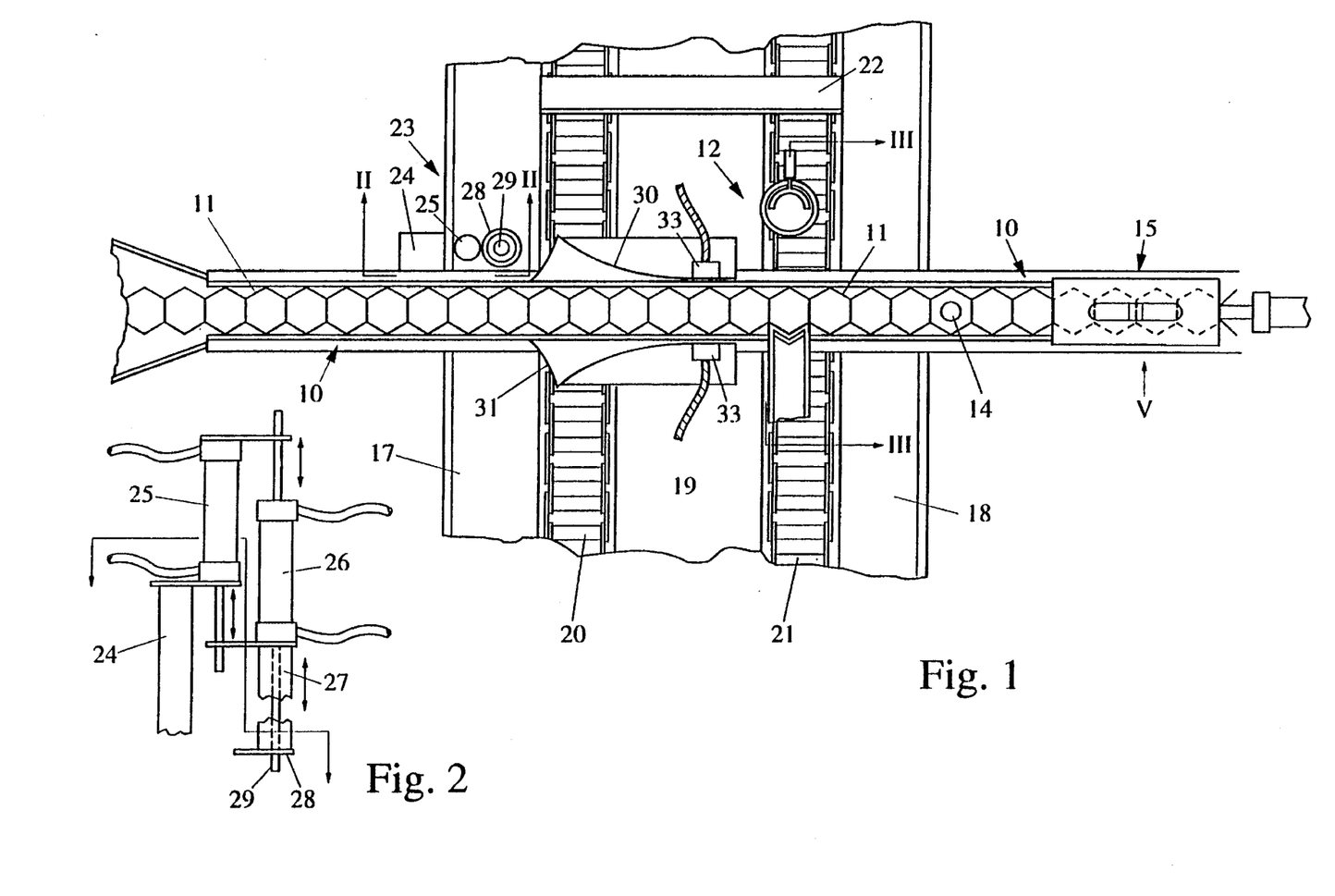
FIG. 1 is a plan view illustrating schematically the positioning of a transplanting mechanism according to the present invention with various parts omitted for the sake of clarity.
FIG. 2 is a partial section view taken along line II—II of FIG. 1.

Referring to FIG. 1, the preferred apparatus comprises a first guide track 10 arranged for guiding a seedling propagating cell chain 11 past a transplanting station 12. The cell chain may be produced according to the U.S. patent referred to above but other forms of cell chains or propagating containers might be used. The cell chain 11 is led from the transplanting station 12 past a reject plant eject mechanism 14 by a chain movement actuator 15 with the now empty cell chain eventually being delivered to an empty cell chain storage zone (not illustrated).

Immediately beneath the first guide track 10, at least in the vicinity of the transplanting station 12 is a second guide tract 16. The guide track 16 is adapted to convey trays of individual potting containers or the like past the station 12. The containers adapted to receive the plants or seedlings might be individual containers, trays with an array of receptacles, each being adapted to receive a plant, or even a second larger cell chain. In the embodiment illustrated the guide track 16 conveys uniform arrays of receptacles (either individual or in preformed trays including a number of such receptacles). The guide track 16 comprises L shaped outer guides 17,18 and a central support surface 19 all of which are stationary in the transport direction. A pair of endless chains 20,21 are provided between the guides 17,18 and the central support surface 19. The chains carry spaced pusher bars 22 arranged to move the required array of planting receptacles past the transplanting station 12.

In a preferred form of apparatus, the second guide track 16 is arranged to pass simultaneously a plurality of transversely spaced receptacles therealong. In such an arrangement there would be a need to have a plurality of first guide tracks each with a transplanting station 12 in line with a respective line of receptacles moved along the second guide track 16. As illustrated in FIGS. 1 and 2, a planting zone preparation mechanism 23 is provided to prepare a planting zone in the receptacles conveyed on the track 16. The mechanism 23 illustrated in FIG. 1 would be for a transplanting station 12 located downstream of the position illustrated in FIG. 1. Similarly, a planting zone preparation mechanism 23 as illustrated would be located upstream and in line with transplanting station 12 actually illustrated in FIG. 1.

The planting zone preparation mechanism 23 comprises a support post 24 which may be adjustably moved in the transverse direction of the track 16. A first actuating air cylinder 25 is mounted from the post 24 and is adapted to move a second actuating air cylinder 26 as well as a first pressure member 27 against propagating medium in a receptacle arranged immediately therebelow on the guide track 16. The pressure member 27 caries at its lower end a substantially flat annular plate 28 adapted to press and consolidate the propagating medium in the receptacle. The second actuating air cylinder 26 actuates a rod member 29 to extend beyond the plate 28 to form the plant receiving hole in the receptacle.

The or each transplanting station 12 comprises a pair of guide plates 30,31 arranged to guide seedling foliage 32 into a predetermined sensing zone. Sensor means 33 are provided to direct a sensing beam or the like across the passage of seedlings carried by the chain 11. The sensor means may comprise any suitable form of infra-red detectors or optical fibre sensors. Conveniently the sensor sequentially samples the detection zone to compare the existence of a seedling stalk and/or foliage to determine if a plant exists and if it does exist if its development is sufficient to allow it to be transplanted. The sensing equipment may also be used to sense colour of the vegetation against any desired datum to determine whether a plant is suitable for transplanting. If the sensor 33 determines that a plant is suitable for transplanting, a signal is provided to the plant transfer mechanism 12 to activate same. If there is no plant or the plant is unsuitable, the mechanism 12 is not actuated and a signal is provided to the reject/eject mechanism 14 to remove the rejected plant and/or plant propagating medium from the cell chain when it reaches the eject mechanism.

Figure 7:
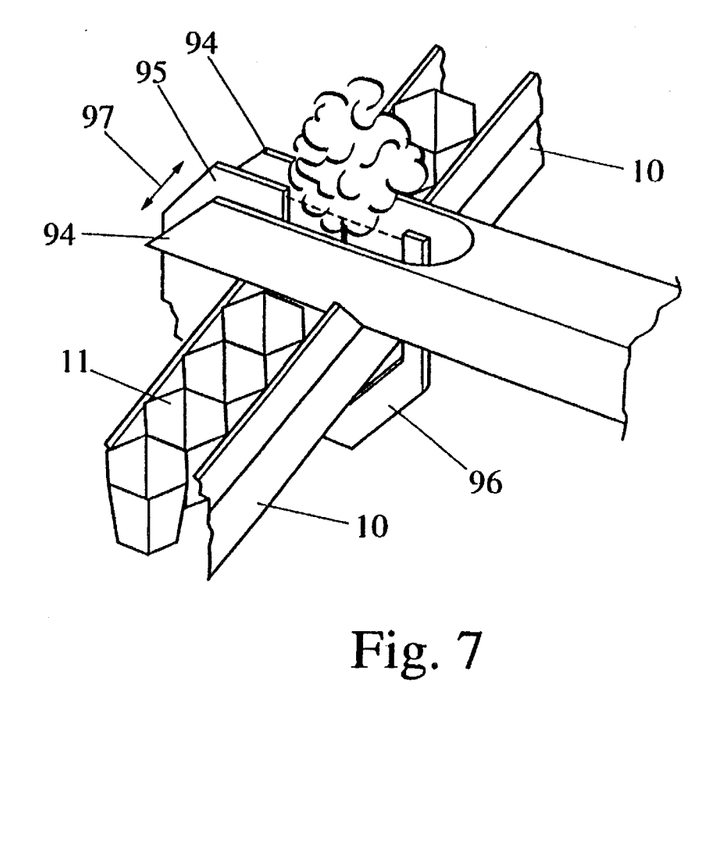
FIG. 7 is a perspective view of an alternative embodiment for sensing the existence of a suitable plant in the chain for the transplanting.

FIG. 7 of the accompanying drawings illustrates an alternative embodiment for sensing the existence of a plant suitable for transplanting. In the previous embodiment, described with reference to FIG. 1, there is a possibility in some instances, particularly with spreading foliage plants that foliage might be sensed from an adjacent cell rather than the cell under observation. In FIG. 7, such incorrect readings are prevented by the use of a pair of knives 94 that move across the cell delivery path 10 once a cell of the cell chain 11 is indexed into position. The knives 94 serve to isolate the cell being examined so that only one plant foliage is looked at by the fibre optic scanner 95. The scanner 95 is conveniently joined by a yoke 96 mounted for movement along the path 10 as shown by arrow 97. The extent of movement approximates the width between the knives 94 to enable this zone to be fully scanned to check whether a suitable plant is present or not. If a plant is not present the plug is ejected, however, if a plant is located, it is transplanted as hereinafter described.

Figures 3, 3A, 3B:
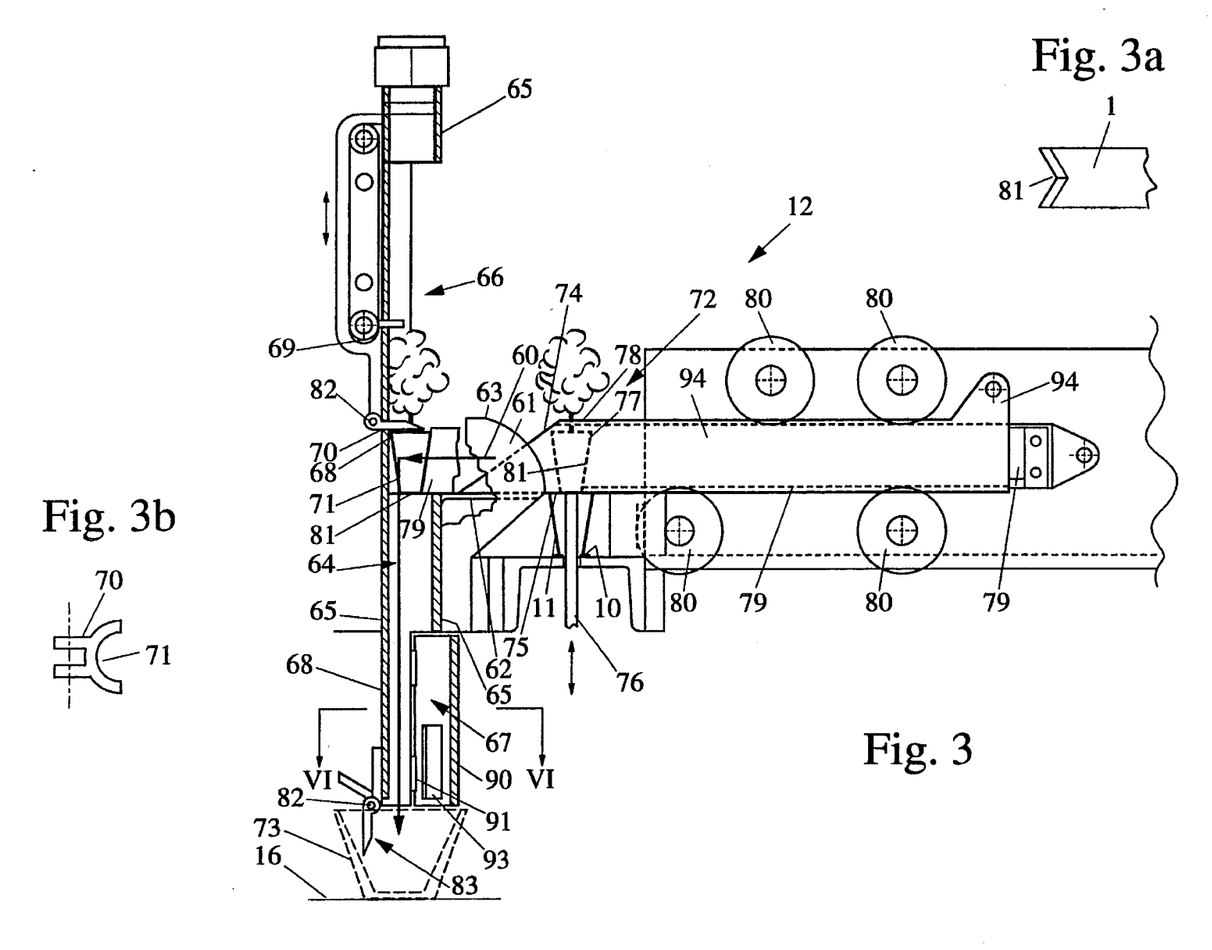
FIG. 3 is a partial section view taken along line III—III of FIG. 1 showing the transfer mechanism in more detail.
FIG. 3a is a fragmentary, enlarged, plan view of a detail of the invention.
FIG. 3b is a top plan view of another detail.

Referring now to FIG. 3, the transfer mechanism 12 is shown in more detail. The mechanism 12 comprises a first plant delivery path (arrow 60) defined by a pair of upstanding walls 61 and a base wall 62 extending laterally from the track 10 at or adjacent the upper level of the cell chain 11 arranged on the track 10. The upper edge 63 of the upstanding walls 61 are curved so that the walls increase in height as they move away from the track 10. A first guide chute 72 is provided so that it is capable of movement across the track 10 and is cooperable with the walls 61, 72 to provide an extension of the first plant delivery path 60. At the end of the first plant delivery path 60 there is a second plant delivery path (arrow 64) defined by a generally vertical tubular construction forming a second guide chute 65. The tube 65 has open sections 66 and 67 around part of its periphery to enable entry of a plant together with its propagating medium plug into the second guide chute and out of the second guide chute after planting. The second guide chute 65 includes a longitudinal slot 68 and outwardly located carriage 69 connectible to an operating cylinder (not shown). At the lower end of the carriage 69 there is provided a pusher member 60 that is connected to the carriage 69 through the slot 68 for movement therewith between an initial elevated position and a lowered planting position. The pusher member 70 is generally horse show shaped in plan view so that its outer edges are guided within the second guide chute 65 and an open area 71 is provided to enable a plant stem to enter into the zone within the horse show shape. The free ends of the pusher member may be shaped as illustrated to promote entry of the plant therein with minimum or no damage to the plant.

Figure 6:
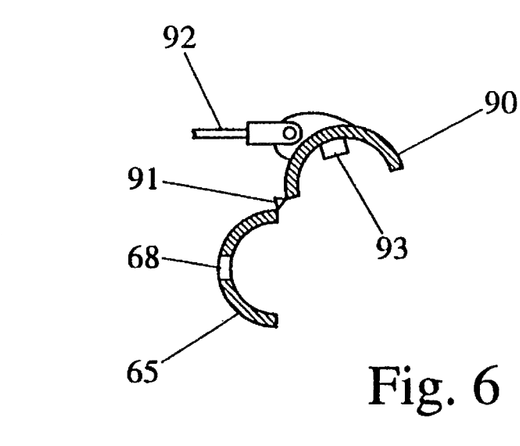
FIG. 6 is a detailed section view taken along line VI—VI of FIG. 3.

The lower open section 67 may have a door or like member 90 hinged at 91 to one edge of the open section 67. The member 90 is movable between an open position as illustrated in FIGS. 3 and 6 to a closed position where the door member completes the tubular shape of the second guide chute 65. The opening or closing of the member 90 may be achieved by means of a link member 92 and an actuating cylinder (not shown). The pusher member 70 is connected to the carriage 69 by means of a hinge pin 82 that allows the pusher member 70 to transfer from the horizontal lowering planting position to an intermediate vertical position 83 once it is clear of the second plant delivery path 64 at its lower end. This allows the pusher member to clear completely the plant foliage once it has been pressed into the prepared planting position as it is moved back to the initial elevated position to recommence a planting operation.

It will be appreciated from the drawings that the door or member 90 includes, on its inner face, a downwardly directed wedge 93 configured to correspond with the taper on the plant propagating medium plug to stabilize the plant and its growing medium in the correct position in the lower end of the second guide chute 65 ready for planting. The provision of the door in the closed position aids in keeping the plant vertical when being planted but the door opens immediately the plant is indexed on so as to allow the plant foliage free passage.

The first guide chute 72 and an associated pusher member 79 are provided on the side of the track 10 opposite to the delivery paths 60, 64. Both of these are operated by appropriate operating cylinders (not illustrated). The first guide chute 72 comprises a pair of spaced blades 94 reciprocable across the to of the cell chain 11. Each blade slides inside of one upstanding wall 61 of the first plant delivery path 60 so that when the blades 94 are extended (as illustrated), the blades form a continuous of the first plant delivery path 60 across the top of the cell chain 11. A forward end of the first guide chute 72 is formed so that the blades 94 are pointed with a diverging upper edge 74 that lifts the plant foliage in co-operation with the wall edges 63 when moving towards the extended position illustrated. Each blade 94 also includes a sharpened cutting edge 75 along its lower edge at least in the region that traverses across the cell chain 11. This edge 75 is adapted to cut any root material or the like that might have extended between adjacent cells of the cell chain. A push rod member 76 is provided below the track 10, actuated by a suitable cylinder (not shown) to force a plant and propagating medium plug 77 upwardly out of the cell chain 11 and into the first plant delivery path 60. Each of the blades 94 has an inwardly turned tab 78 that prevents the plug 77 being forced beyond the desired position as illustrated.

In addition, the mechanism includes an elongated square or rectangular pusher member 79 that moves reciprocably between the blades 94 and is actuated by a suitable cylinder again not shown. The pusher member is constrained top and bottom between rollers 80 to move along the desired path. The rollers 80 also include circumferential grooves for constraining and guiding the blades 94 to move on their desired path. The forward end of the pusher member 79 is configured to correspond to the shape of the plant plug 77, that is it has a generally downwardly and forwardly angled surface 81 so that when it moves a plug to the position indicated at 77' the plug is held by the surface 81 and the wall of the second guide chute 65. The plug 77' can then move along the second guide chute 65 in a planting direction under action of the horse shoe member 70 when the pusher member 79 withdraws. The forward surface 81 may also be configured laterally to the shape of the plug which is hexagonal in the preferred embodiment.

Briefly, operation of the transfer mechanism is as follows. Firstly, a suitable plant is positioned in the track 10. The blades 94 then come across and cut any excess root material and lift foliage in co-operation with the walls 61. The pusher member 76 lifts the plug 77 and the pusher member 79 delivers the plant into the second guide chute 65. Upon withdrawal of the pusher member 79 (and blades 94) the horse shoe member 70 pushes the plug in the position 77' along the second guide chute and into the previously prepared planting position in a second container 73 located on the second guide track 16. The member 70 firmly pushes the plug down into the desired planting position in the second container 73.

Figures 4, 5:
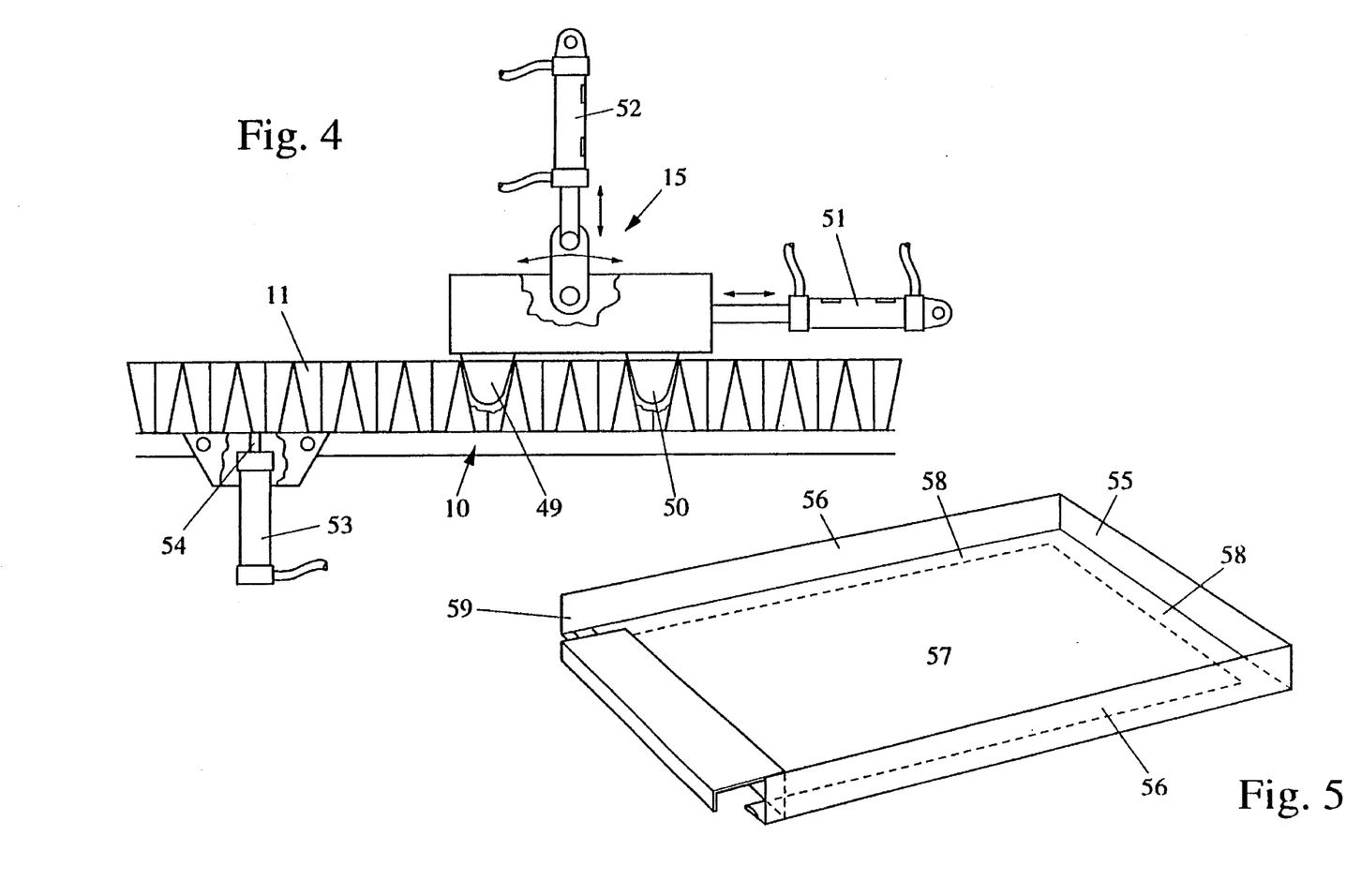
FIG. 4 is a detailed side elevation view of the region shown in FIG. 1 by arrow V.
FIG. 5 is a perspective view of an infeed storage tray usable in the apparatus shown in FIG. 1.

Referring now to FIG. 4, a mechanism for indexing the cell chain 11 along the guide track 10 is illustrated. The mechanism 15 comprises a block member 48 with spaced downward projections 49,50 adapted to fit into and locate the cell chain 11 in a desired position. The cell chain is moved by an actuating air cylinder 51 moving the block member 48 to the right as shown in FIG. 4. A repeat movement is achieved by the cylinder 52 lifting the block member, the cylinder 51 moving the block member to the left and the cylinder 52 again lowering the block member 48 to engage the projections 49,50 with the chain 11. FIG. 4 also illustrates the reject plant eject mechanism 14 which may simply comprise an air cylinder 53 with a push rod 54 for ejecting a plant/plug from the cell chain.

FIG. 5 of the drawings illustrate a storage tray 55 in which a cell chain may be located during growing periods of plants propagated in the chain. The tray 55 comprises an outer frame 56 of generally rectangular configuration and a lower free floor 57 resting on a ledge 58 of the outer frame. Thus, when the tray is placed on a pedestal support of outer dimensions less than the perimeter defined by the ledge 58, the outer frame 56 may be dropped away allowing the cell chain to be fed therefrom directly into a guide track such as that shown in FIG. 1. Conveniently, the outer frame 56 has an opening such as at 59 to enable ends of a cell chain to be connected to a new length of cell chain in a second storage tray.

The timing and control of the various actuating devices such as the sensors and the various air cylinders is conveniently achieved by means of a computer control. Conveniently the cell chain advance mechanism 15 might be adapted to reverse the movement of the cell chain should a jam in operation occur. The reverse movement being restricted to a limited amount in an endeavour to clear any transient jam that may have occurred. In addition, the width of the second guide track 16 might be conveniently adjusted by making one or both of the side members 17,18 movable transversely to the chains 20,21.

I claim:

1. Apparatus for moving a plant or seedling having upstanding foliage from one container having an upper edge and conveyed along a first predetermined path to a prepared planting position in a second container that is moved along a second predetermined path, said apparatus comprising a first plant delivery path extending transversely from said first predetermined path at a level at or above said upper edge of said one container, second plant delivery path extending from said first plant delivery path to a position adjacent said second predetermined path to deliver a plant or seedling to said prepared planting position in said second container, a first guide chute movable to an extended position at least partially across the first predetermined path above said one container to form an extension of said first plant delivery path at least partially across said one container, said first guide chute having a forward end arranged to lift plant foliage as the first guide chute moves to said extended position, said guide chute also being retractable from said extended position, ejection means for moving the plant or seedling upwardly out of a container on said first predetermined path into said extension of said first plant delivery path, first movement means for moving the plant or seedling along said first plant delivery path into said second plant delivery path, and second movement means for moving said plant or seedling along said second plant delivery path into said prepared planting position.

2. Apparatus according to claim 1 wherein said one container contains one plant or seedling and each of said one containers is conveyed in single file along said first predetermined path.

3. Apparatus according to claim 1 wherein said first guide chute comprises a pair of blades movable to and fro across the first predetermined path, each of said blades having a forward end and an upper edge diverging from said forward end arranged to lift plant foliage as the blade moves across said first predetermined path.

4. Apparatus according to claim 3 wherein each of said blades includes a lower cutting edge engagable with the upper edge of said one container to separate any root mass extending therefrom to an adjacent container.

5. Apparatus for moving a plant or seedling from one container having an upper edge and conveyed along a first predetermined path to a prepared planting position in a second container that is moved along a second predetermined path, said apparatus comprising a first plant delivery path extending transversely from said first predetermined path at a level at or above said upper edge of said one container, and a second plant delivery path extending from said first plant delivery path to a position adjacent said second predetermined path to deliver a plant or seedling to said prepared planting position in said second container, a first guide chute movable to an extended position arranged at least partially across the first predetermined path above said one container to form an extension of said first plant delivery path at least partially across said one container, said guide chute also being retractable from said extended position, ejection means for moving the plant or seedling upward out of said container into said extension of said first plant delivery path, first movement means for moving the plant or seedling along said first plant delivery path into said second plant delivery path, second movement means for moving said plant or seedling along said second plant delivery path into said prepared planting position, and a second guide chute forming at least part of said second delivery path, said second guide chute having one or more openings along its length enabling a plant or seedling to be introduced laterally into said second guide chute and to enable a said plant or seedling to be removed laterally from said second guide chute.

6. Apparatus according to claim 5 wherein the second guide chute includes a movable member adjacent at least one of said openings of said second guide chute, said movable member being movable between a first position allowing free access through the said one adjacent opening and a second position preventing access through said one adjacent opening.

7. Apparatus according to claim 6 wherein said movable member includes a plant-engaging restriction extendable into said second guide chute when said movable member is in said second position.

8. Apparatus according to claim 5 wherein said second movement means comprises an actuating mechanism located outwardly of said second guide chute having a push member movable within said second guide chute along said second delivery path between an initial elevated position and a lowered planting position, said push member being generally horseshoe-shaped to receive said plant or seedling within the push member when in said elevated position as the plant or seedling is introduced into said second guide chute, said pusher member engaging only a portion of the seedling or plant during movement toward said lowered planting position thereby moving said seedling or plant toward said prepared planting position.

9. Apparatus according to claim 8 wherein said push member is further movable to an intermediate inoperative position clear of engaging said seedling or plant during return movement toward said elevated position whereby foliage of said planted seedling or plant is not engaged by said pusher member as it moves from said lowered planting position to said elevated position.

10. Apparatus for moving a plant or seedling from one container having an upper edge and conveyed along a first predetermined path to a prepared planting position in a second container that is moved along a second predetermined path, said apparatus comprising a first plant delivery path extending transversely from said first predetermined path at a level at or above that of said upper edge of said one container, a second plant delivery path extending from said first plant delivery path to a position adjacent said second predetermined path to delivery a plant or seedling to said prepared planting position in said second container, a first guide chute movable to an extended position arranged at least partially across the first predetermined path above said one container to form an extension of said first plant delivery path at least partially across said one container, said guide chute also being retractable from said extended position, ejection means for moving the plant or seedling upwardly out of said container into said extension of said first plant delivery path, first movement means for moving the plant or seedling along said first plant delivery path into said second plant delivery path, second movement means for moving said plant or seedling along said second plant delivery path into said prepared planting position, and sensing means for scanning a zone above said one container over a portion of said first predetermined path to sense the presence and selected characteristics of a seedling or plant within said scanning zone, said first guide chute having spaced walls adjacent said sensing means defining said scanning zone of said sensing means and isolating a given seedling or plant being scanned from adjacent seedlings or plants.

11. Apparatus according to claim 10 wherein said sensing means is movable in the direction of said first predetermined path between said spaced walls.

* * * * *

UNITED STATES PATENT AND TRADEMARK OFFICE
CERTIFICATE OF CORRECTION

PATENT NO.  : 5,488,802

DATED       : February 6, 1996

INVENTOR(S) : Geoffrey A. Williames

It is certified that error appears in the above-identified patent and that said Letters Patent is hereby corrected as shown below:

On the title page: Item[86]    change "§371 Date" and "§102(e) Date" to -- Jan. 3, 1991 --.

Column 1, line 34, change "wold" to -- would --.

Column 2, line 51, change "is" to -- in --; line 55 change "configures" to -- configured --.

Column 4, line 23, change "caries" to -- carries --.

Column 5, line 10, change "72" to -- 62 --; line 14 change "tube" to -- second guide chute --; line 22, change "60" to -- 70 --; line 25, change "show" to -- shoe --; line 28, change "show" to -- shoe --; line 42 after "intermediate" insert -- inoperative --; line 63, change "to" to -- top --.

Column 6, line 42, after "chute" insert -- 65 --.

Column 8, line 61, change "delivery" to -- deliver --.

Signed and Sealed this

Seventh Day of May, 1996

Attest:

BRUCE LEHMAN

Attesting Officer

Commissioner of Patents and Trademarks